US011172360B2

(12) United States Patent
Catovic et al.

(10) Patent No.: US 11,172,360 B2
(45) Date of Patent: Nov. 9, 2021

(54) TRANSFER OF SECURITY PROTECTED CONFIGURATION DATA FROM HPLMN

(71) Applicant: QUALCOMM Incorporated, San Diego, CA (US)

(72) Inventors: Amer Catovic, Carlsbad, CA (US); Lenaig Genevieve Chaponniere, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 15/892,067

(22) Filed: Feb. 8, 2018

(65) Prior Publication Data

US 2019/0116496 A1 Apr. 18, 2019

Related U.S. Application Data (60) Provisional application No. 62/572,063, filed on Oct. 13, 2017.

(51) Int. Cl.
*H04W 12/06* (2021.01)
*H04L 29/06* (2006.01)
(Continued)

(52) U.S. Cl.
CPC .......... *H04W 12/06* (2013.01); *H04L 9/0643* (2013.01); *H04L 9/3242* (2013.01);
(Continued)

(58) Field of Classification Search
USPC ................ 713/181, 150, 163; 726/2, 21, 36; 380/255, 264, 276
See application file for complete search history.

(56) References Cited

U.S. PATENT DOCUMENTS 7,216,365 B2 * 5/2007 Bhagwat ............... H04L 69/161
726/23
9,686,238 B1 * 6/2017 Row, II ............... H04L 63/0428
(Continued)

FOREIGN PATENT DOCUMENTS

EP 3035724 A1 6/2016
EP 3386241 A1 10/2018
(Continued)

OTHER PUBLICATIONS

Partial International Search Report—PCT/US2018/050390—ISA/EPO—dated Nov. 29, 2018, 12 pages.
(Continued)

*Primary Examiner* — Sharif E Ullah
(74) *Attorney, Agent, or Firm* — The Marbury Law Group, PLLC (57) ABSTRACT

Protected configuration data may be sent to user equipment subscribed to a first wireless communication network by a second wireless communication network with which the user equipment is registered. The first wireless communication network may protect the configuration data based on at least one first key when sending the data to the second wireless communication network. The second wireless communication network may send the configuration data to user equipment in messages protected by at least one second key. User equipment receives the message from the second wireless communication network, extracts the configuration data using the at least one second key, determines whether the configuration data has been altered at least in part based on the at least one first key, and applies the configuration data if the configuration data has not been altered. The protected configuration data may be sent in an information element of a control plane message.

23 Claims, 8 Drawing Sheets

(51) Int. Cl.
  *H04W 8/20* (2009.01)
  *H04W 12/02* (2009.01)
  *H04L 9/06* (2006.01)
  *H04W 12/106* (2021.01)
  *H04L 9/32* (2006.01)
  *H04W 8/02* (2009.01)
  *H04W 84/04* (2009.01)

(52) U.S. Cl.
  CPC ...... *H04L 63/0428* (2013.01); *H04L 63/0435* (2013.01); *H04L 63/0478* (2013.01); *H04L 63/0892* (2013.01); *H04W 8/02* (2013.01); *H04W 8/20* (2013.01); *H04W 12/02* (2013.01); *H04W 12/106* (2021.01); *H04L 2209/80* (2013.01); *H04W 84/042* (2013.01)

(56) References Cited

U.S. PATENT DOCUMENTS

| 2007/0015589 | A1* | 1/2007 | Shimizu | G06F 21/6245 463/43 |
| 2013/0254200 | A1* | 9/2013 | Sachs | G06Q 10/105 707/737 |
| 2015/0271667 | A1* | 9/2015 | Bernsen | H04W 12/041 713/171 |
| 2016/0249186 | A1* | 8/2016 | Durnov | H04W 12/04 |
| 2017/0150358 | A1* | 5/2017 | Zhang | H04L 63/08 |
| 2017/0332354 | A1* | 11/2017 | Chang | H04W 72/04 |
| 2019/0116496 | A1* | 4/2019 | Catovic | H04L 63/0435 |

FOREIGN PATENT DOCUMENTS

| WO | 03015360 A2 | 2/2003 |
| WO | 2015064056 A1 | 5/2015 |
| WO | 2017113264 A1 | 7/2017 |

OTHER PUBLICATIONS

International Search Report and Written Opinion—PCT/US2018/050390—ISA/EPO—dated Feb. 28, 2019.

Jung Y., et al., "Tunnel Gateway Satisfying Mobility and Security Requirements of Mobile and IP-based Networks", Journal of Communications and Networks, New York, NY, USA,IEEE, US, vol. 13, No. 6, Dec. 1, 2011 (Dec. 1, 2011), pp. 583-590, XP011423895, ISSN: 1229-2370, DOI. 10.1109/JCN.2011.6157474 p. 540, left-hand column, line 22—p. 541, right-hand column, line 16 p. 589, right-hand column, line 1—p. 590, left-hand column, line 12, figures 3-5.

* cited by examiner

TRANSFER OF SECURITY PROTECTED CONFIGURATION DATA FROM HPLMN

RELATED APPLICATIONS

This application claims the benefit of priority to U.S. Provisional Application No. 62/572,063 entitled "Transfer of Security Protected Configuration Data from HPLMN" filed Oct. 13, 2017, the entire contents of which are hereby incorporated by reference.

BACKGROUND

Wireless communication networks (referred to simply as "wireless networks" herein) are widely deployed to provide various communication services such as voice, packet data, broadcast, messaging, and so on. Wireless networks are configured to supporting communication for multiple users by sharing the available network resources. Wireless networks share available network resources using one or more multiple-access wireless communications protocols, such as Time Division Multiple Access (TDMA), Code Division Multiple Access (CDMA), and Frequency Division Multiple Access (FDMA). These wireless networks may also utilize various radio technologies, including but not limited to Global System for Mobile Communications (GSM), Universal Mobile Telecommunications System (UMTS), CDMA2000, Advanced Mobile Phone Service (AMPS), General Packet Radio Services (GPRS), Long Term Evolution (LTE), High Data Rate (HDR) technology (e.g., 1×EV technology), etc.

Individual users of wireless networks are typically mobile and a single user may connect to various wireless networks over time. While a user may be a customer of a provider of one wireless network (i.e., the user's home wireless network), the user may connect to a wireless network of another provider (i.e., a visited wireless network). When the user is connected to a visited wireless network, the user's home wireless network may desire to send configuration data to user equipment of the user. For example, the user's home wireless network may send a list of preferred networks for roaming, preferred radio access technologies for roaming, policies for traffic routing, or other configuration data.

The user equipment may be configured to retrieve configuration data via a user plane connection. However, the user equipment would need to be pre-configured in order to establish such connection and/or a policy server would need to be established from which the configuration data could be retrieved.

Alternatively, configuration data may be provided via a control plane message sent from the home wireless network to the user equipment via the visited wireless network. For example, the configuration data may be included in an information element of a control plane message. However, as the control plane message passes via the visited wireless network, the visited wireless network may be able to review and/or alter the configuration data.

SUMMARY

Systems, methods, and devices of various embodiments enable a home public land mobile network (HPLMN) to send secure protected configuration data to user equipment roaming in a visited public land mobile network (VPLMN). Various embodiments include methods that may be implemented in a processor or processing devices of a computing device.

Various embodiments may include a method of sending configuration data from a first wireless communication network to a user equipment via a second wireless communication. Various embodiments may include protecting the configuration data based on at least one key known to the first wireless communication network and the user equipment, including the protected configuration data in a message, and sending the message from the first wireless communication network to the second wireless communication network for delivery to the user equipment by the second network.

In some embodiments, protecting the configuration data based on at least one key may include generating a message authentication code (MAC) of the configuration data. In some embodiments, including the protected configuration data in a message may involve including the configuration data and the MAC in an information element of the message.

Some embodiments may further include encrypting the protected configuration data by the first wireless communication network prior to transmission to the second wireless communication network.

Some embodiments may further include obtaining the configuration data from one or more of: a Home Subscriber Server (HSS) of the first wireless communication network; an Authentication, Authorization, and Accounting (AAA) server of the first wireless communication network; or a Policy Control Function (PCF) of the first wireless communication network.

In some embodiments, the first wireless communication network may be an HPLMN of the user equipment and the second wireless communication network may be a VPLMN of the user equipment.

In some embodiments, the message may be a control plane message. In some further embodiments, the control plane message may include one of an attach accept message, a tracking area update accept message, or a downlink NAS transport message.

In some embodiments, sending the message from the first wireless communication network to a second wireless communication network may include sending the message to a Mobility Management Entity (MME), or an equivalent element, of the second wireless communication network.

Various embodiments may include a method of sending protected configuration data to a user equipment. Such embodiments may include receiving a message containing the protected configuration data from a first wireless communication network by a second wireless communication network, securing the received message based on at least one key, and sending the secured message from the second wireless communication network to the user equipment.

In some embodiments, securing the received message based on at least one key may include encrypting the received message using the at least one key.

In some embodiments, the first wireless communication network may be a home public land mobile network (HPLMN) of the user equipment and the second wireless communication network may be a visited PLMN (VPLMN) of the user equipment.

In some embodiments, the message may be a control plane message including one of an attach accept message, a tracking area update accept message, or a downlink NAS transport message.

In some embodiments, sending the secured message from the second wireless communication network to the user equipment may include sending the secured message from an MME, or an equivalent element, of the second wireless communication network.

Various embodiments may include a method of receiving configuration data from a first wireless communication network by a user equipment. Such embodiments may include receiving a message from a second wireless communication network in which the message includes configuration data from the first wireless communication network that was received by the second wireless communication network, the configuration data is secured based on at least one first key, and the message is secured based on at least one second key, extracting the configuration data from the message at least in part based on the at least one second key, determining whether the configuration data has been altered at least in part based on the at least one first key, and applying the configuration data in response to determining that the configuration data has not been altered.

In some embodiments, the configuration data may include the configuration data and a first message authentication code (MAC) of the configuration data generated by the first wireless communication network based on the at least one first key. In such embodiments, determining whether the configuration data has been altered at least in part based on the at least one first key may include generating a second MAC of the configuration data based on the at least one first key, and determining whether the first MAC and the second MAC match.

In some embodiments, extracting the configuration data from the message may include decrypting the message based on the at least one second key, extracting encrypted configuration data from the decrypted message, and decrypting the encrypted configuration data based on the at least one first key.

In some embodiments, the first wireless communication network may be a home public land mobile network (HPLMN) of the user equipment and the second wireless communication network may be a visited PLMN (VPLMN) of the user equipment.

In some embodiments, the method may include discarding the configuration data in response to determining that the configuration data has been altered.

Some embodiments may include de-registering the user equipment from the second wireless communication network in response to determining that the configuration data has been altered.

Some embodiments may include placing the second wireless communication network on a list of forbidden networks.

Some embodiments may include establishing a connection with a server of the first wireless communication network and retrieving the configuration data from the server via the established connection in response to determining that the configuration data has been altered.

In some embodiments, the message may be a control plane message including one of: an attach accept message; a tracking area update accept message; or a downlink NAS transport message.

In some embodiments, receiving a message from a second wireless communication network may include receiving the message from a MME, or an equivalent element, of the second wireless communication network.

Various embodiments include user equipment including a processor configured with processor-executable instructions to perform operations of any of the methods summarized above. Various embodiments include a server for use in a wireless communication network that is configured with processor-executable instructions to perform operations of any of the methods summarized above. Various embodiments also include a non-transitory processor-readable medium on which is stored processor-executable instructions configured to cause a processor of a wireless communication device or a server to perform operations of any of the methods summarized above. Various embodiments also include a user equipment having means for performing functions of any of the methods summarized above. Various embodiments also include a server for use in a wireless communication network that includes means for performing functions of any of the methods summarized above. Various embodiments also include wireless communication systems including a server in a first wireless communication network, a server in a second wireless communication network and a user equipment in which the servers and user equipment are configured to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features herein.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In various embodiments, a user's wireless communication device (commonly referred to as "user equipment" (UE)) receiving network service via a subscription to one wireless communication network, referred to as the home public land mobile network (HPLMN), may desire service via another wireless communication network, referred to as a visited PLMN (VPLMN). For example, the user may be traveling in an area where the user's HPLMN does not provide access to the user's equipment. Hence, the user may need to "roam" via a VPLMN. There may be multiple other wireless communication networks available in the area and the user's HPLMN may have a preference for which of the wireless communication networks the user's device accesses. If the user's user equipment registers with a non-preferred network, the user's HPLMN may send configuration data to the user equipment prompting the UE to re-register with a preferred network. However, the VPLMN, which may be a competitor to the HPLMN, and therefore should not have access to the preferred roaming list of the HPLMN when updated configuration data is transmitted from the HPLMN to the user equipment.

Various embodiments enable a HPLMN to send configuration data to user equipment attached to a VPLMN in a secure and protected fashion. In various embodiments, the HPLMN protects the configuration data using keys associated with the HPLMN and the user equipment.

The terms "wireless network," "cellular network," "HPLMN," "VPLMN," and "cellular wireless communication network" are used interchangeably herein to refer to a portion or all of a wireless network of a carrier associated with a user equipment and/or subscription on a user equipment.

Wireless communication networks are widely deployed to provide various communication services such as voice, packet data, broadcast, messaging, and so on. These wireless networks may be capable of supporting communications for multiple users by sharing the available network resources. Examples of such wireless networks include Long-Term Evolution (LTE) networks, LTE Advanced networks, the Global System for Mobile Communications (GSM) networks, Code Division Multiple Access (CDMA) networks, Time Division Multiple Access (TDMA) networks, and Frequency Division Multiple Access (FDMA) networks. Wireless networks may also utilize various radio technologies such as Wideband-CDMA (WCDMA), CDMA2000, Global System for Mobile Communications (GSM), etc. While reference may be made to procedures set forth in LTE standards such references are provided merely as examples, and the claims encompass other types of cellular telecommunication networks and technologies, including those currently under development.

Modern mobile communication devices or (e.g., smartphones) may each include at least one subscriber identity module (SIM) that enables a user to connect to different mobile networks while using the same mobile communication device. Each SIM serves to identify and authenticate a subscriber using a particular mobile communication device, and each SIM is associated with only one subscription. For example, a SIM may be associated with a subscription to one of GSM, TD-SCDMA, CDMA2000, or WCDMA networks.

Mobile networks may use a plurality of radio access technologies (RATs) to support wireless communications with subscribers, and modern wireless communication devices are typically configured to support wireless communications via multiple RATs. For example, a SIM that enables a subscription that supports communications with a mobile network operator using the GSM RAT may also support communications with the network using the WCDMA and LTE RATs. The ability to communicate using different RATs enables wireless communication devices to support a broad range of network services.

Figure 1:
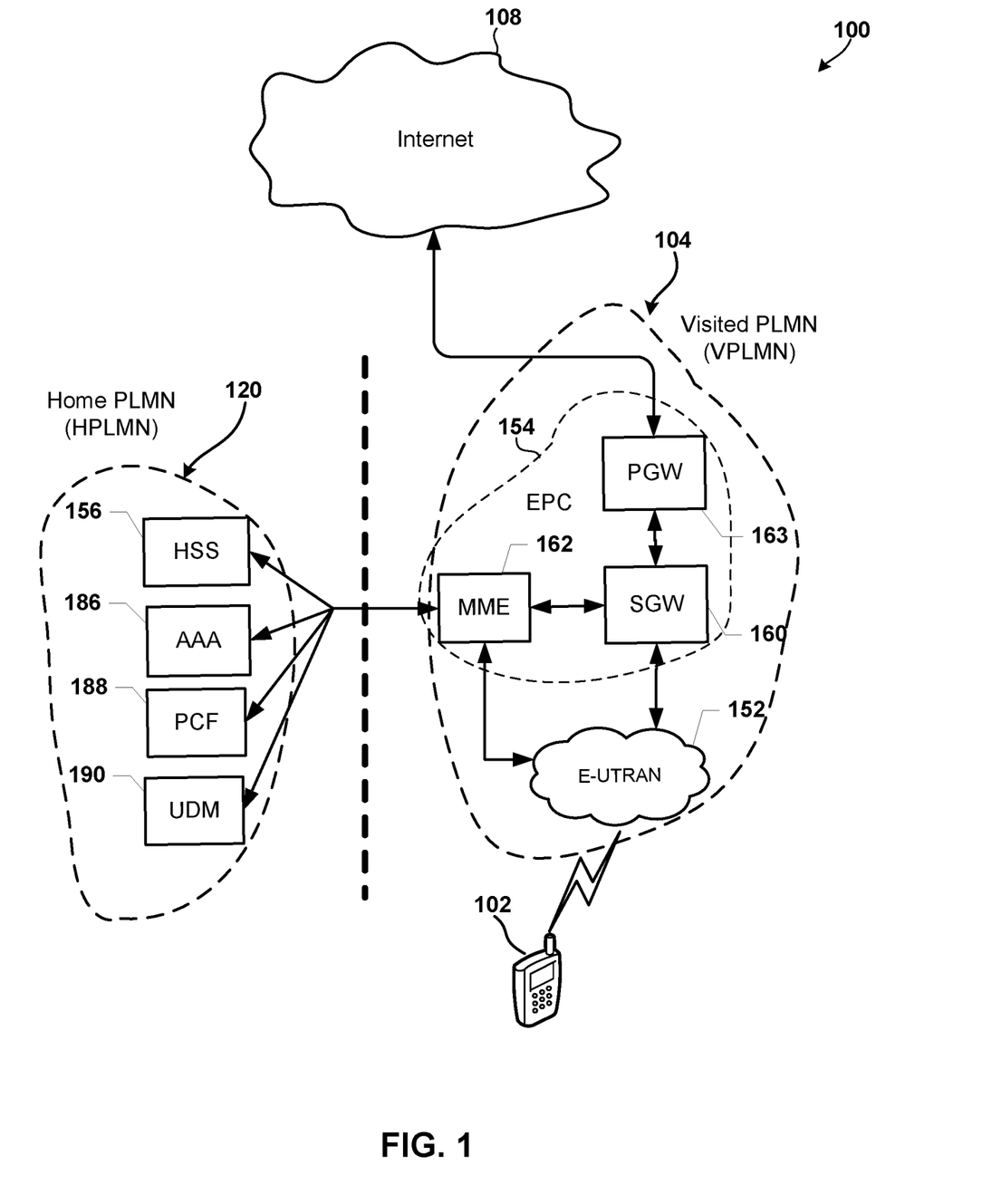
FIG. 1 is a system block diagram of a network architecture suitable for use with various embodiments.

Various embodiments may be implemented within a variety of communication systems, such as the example communication system 100 illustrated in FIG. 1. The communication system 100 may include one or more wireless communication devices 102 in communication with one or more wireless communication networks 104, 120.

In the communication system 100, wireless communication device 102 may be connected to an LTE access network, for example, an Evolved UMTS Terrestrial Radio Access Network (E-UTRAN) 152 of wireless communication network 104 (i.e., VPLMN). In the various embodiments, the E-UTRAN 152 may be a network of LTE base stations (i.e., eNodeBs) (not shown). Although not shown in FIG. 1, wireless communication 120 (i.e., HPLMN) may also include an E-UTRAN and/or other Radio Access Network (RAN).

Upon power up, the wireless communication device 102 may search for wireless networks from which the wireless communication device 102 can receive communication service. The wireless communication device 102 may be configured to prefer particular networks when available by defining a priority list in which the particular networks occupy the highest spots.

The wireless communication device 102 may perform registration processes on one of the identified networks (referred to as the serving network), and the wireless communication device 102 may operate in a connected mode to actively communicate with the serving network (e.g., VPLMN of FIG. 1). Alternatively, the wireless communication device 102 may operate in an idle mode and camp on the serving network if active communication is not required by the wireless communication device 102. In the idle mode, the wireless communication device 102 may identify all radio access technologies (RATs) in which the wireless communication device 102 is able to find a "suitable" cell in a normal scenario or an "acceptable" cell in an emergency scenario, as specified in the LTE standards, such as 3GPP TS 36.304 version 8.2.0 Release 8, entitled "LTE; Evolved Universal Terrestrial Radio Access (E-UTRA); User Equipment (UE) procedures in idle mode."

In various embodiments, each E-UTRAN (e.g., E-UTRAN 152 of FIG. 1) may provide to user equipments an access point to an LTE core (e.g., an Evolved Packet Core). For example, the VPLMN may further include an Evolved Packet Core (EPC) 154 to which the E-UTRAN 152 may connect. In various embodiments, the EPC 154 may include at least one Mobility Management Entity (MME) 162, a Serving Gateway (SGW) 160, and a Packet Data Network (PDN) Gateway (PGW) 163, particularly in an LTE/4G network. Equivalent network elements in other communication protocols may be used in various embodiments. For example, the equivalent of the MME element in a 5G network is referred to as the Access and Mobility Function (AMF) that performs the same or similar functionality relevant to the various embodiments.

In various embodiments, the E-UTRAN 152 may connect to the EPC 154 by connecting to the SGW 160 and to the MME 162, or an equivalent element, within the EPC 154. The MME 162 (or an equivalent element), which may also be logically connected to SGW 160, may handle tracking and paging of the wireless communication device 102 and security for E-UTRAN access on the EPC 154. Although not shown, wireless communication network 120 may include a similar EPC with similar elements and/or different elements performing similar functions.

In addition to connecting to elements of the VPLMN, the MME 162, or an equivalent element, may be linked to various servers and/or functions in other wireless communication networks including the HPLMN of the user equipment 102 (i.e., wireless communication network 120 of FIG. 1). Wireless communication network 120 may include a Home Subscriber Server (HSS) 156, which may support a database containing user subscription, profile, and authentication information. Wireless communication network 120 may also include an Authentication, Authorization, and Accounting (AAA) server 186, which may perform authentication, authorization, and accounting functions for and on behalf of the HPLMN. Wireless communication network 120 may also include a Policy Control Function (PCF) 188, which may support a database containing policy information and may perform policy control for and on behalf of the HPLMN. The wireless communication network 120 may include a Unified Data Management (UDM) 190, which may support a database containing user equipment subscription data information. In various embodiments, the MME 162, or an equivalent element, may connect to any one or more of the HSS 156, the AAA server 186, the PCF 188; and the UDM 190.

Further, the MME 162, or an equivalent element, provides bearer and connection management for user Internet protocol (IP) packets, which are transferred through the SGW 160. In various embodiments, the SGW 160 may be connected to the PGW 163, which may provide IP address allocation to the wireless communication device 102, as well as other functions.

The PGW 163 may connect to packet data networks, through which IP services provided by the network operator may be accessed. For example, the PGW 163 may be connected to at least an IP Multimedia Subsystem (IMS) and the Internet 108 in various embodiments. Other example packet data networks may include enterprise VPNs, content delivery networks, etc.

Various embodiments that are described with respect to LTE may be extended to other telecommunication standards employing other modulation and multiple radio access technologies (RATs). By way of example, various embodiments may be extended to Evolution-Data Optimized (EV-DO) and/or Ultra Mobile Broadband (UMB), each of which are air interface standards promulgated by the 3rd Generation Partnership Project 2 (3GPP2) as part of the CDMA2000 family to provide broadband Internet access to user equipments. Various embodiments may also be extended to Universal Terrestrial Radio Access (UTRA) employing Wideband-CDMA (W-CDMA), GSM, Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, and/or Flash-OFDM employing Orthogonal Frequency-Division Multiple Access (OFDMA). The actual wireless communication standard and the RATs employed depend on the specific application and the overall design constraints imposed on the system.

Figure 2:
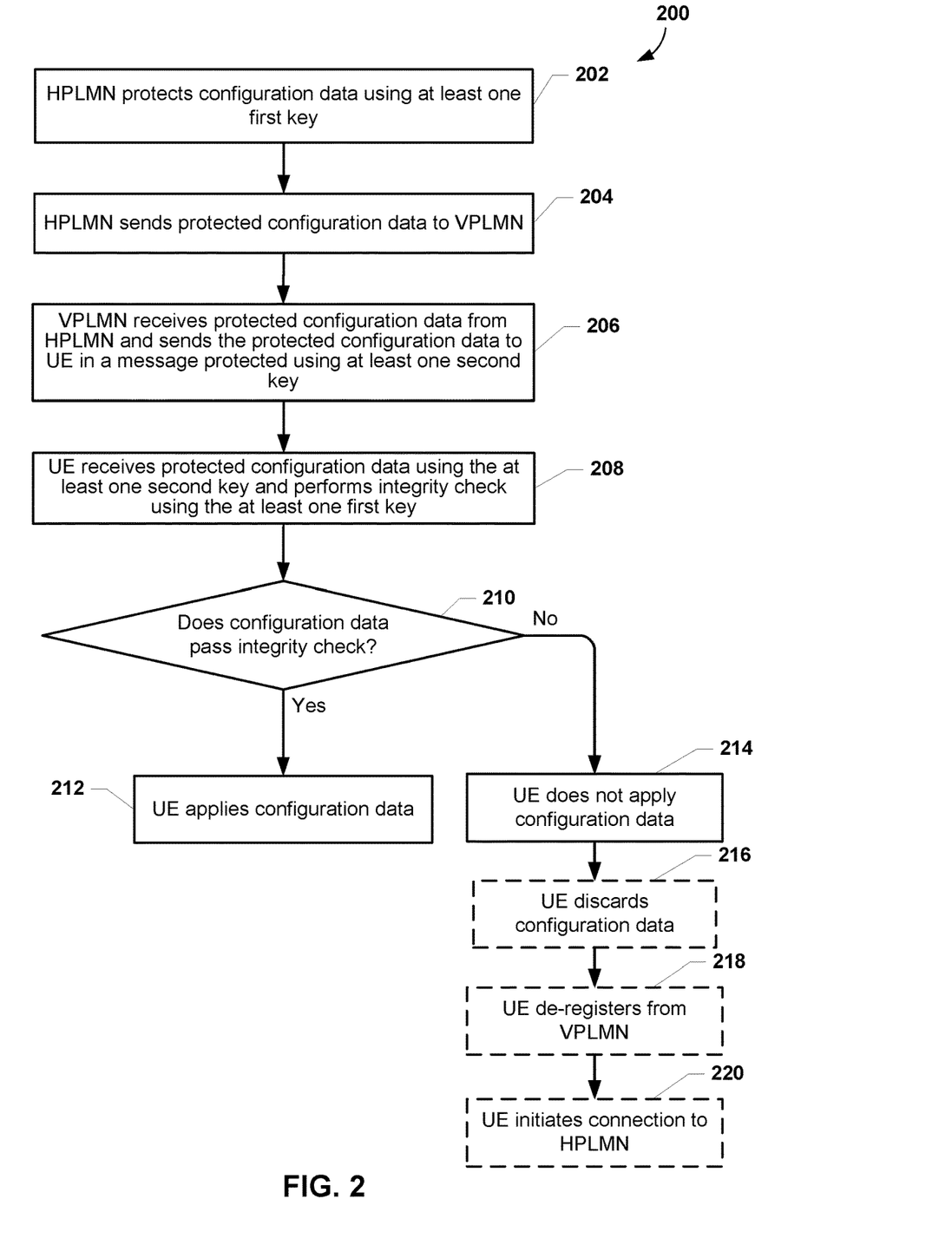
FIG. 2 is a process flow diagram illustrating a method for transferring security protected configuration data from an HPLMN according to various embodiments.

FIG. 2 illustrates a method 200 for sending protected and secure configuration data by an HPLMN to a VPLMN for relay to user equipment according to various embodiments. With reference to FIGS. 1 and 2, the operations of the method 200 may be implemented by one or more processors of a computing device, such as the user equipment 102, the MME 162 (or an equivalent element), the HSS 156, the AAA server 186, the PCF 188, and/or the UDM 190.

In various embodiments, a HPLMN (e.g., a first wireless communication network 120 of FIG. 1) may desire to send configuration data to a user equipment (e.g., user equipment 102 of FIG. 1) via a VPLMN (e.g., a second wireless communication network 104 of FIG. 1). The configuration data may include, for example, a list of preferred networks and/or preferred RAT(s) for roaming, policies for traffic routing, and/or other information provisioned by the HPLMN for the user equipment.

In block 202, the HPLMN may protect the configuration data using at least one first key known to the HPLMN and the user equipment. As described in greater detail below with reference to FIG. 3, the HPLMN may protect the configuration data by generating a message authentication code (MAC). In block 204, the HPLMN may send the protected configuration data to the VPLMN. In some embodiments, the HPLMN may send the protected configuration data to the VPLMN by sending the data to an MME or an equivalent element of the VPLMN (e.g., MME 162 of FIG. 1).

In block 206, the VPLMN may receive the protected configuration data from the HPLMN and may send the protected configuration data to the user equipment in a message. As described in greater detail below with reference to FIG. 4, the VPLMN may send the protected configuration data to the user equipment in a message transmitted in a secure channel established between the user equipment and an MME of the VPLMN. The secure channel and/or the message may be protected using at least one second key known to the VPLMN and the user equipment.

In block 208, the user equipment may receive the protected configuration data from the VPLMN and a processor of the user equipment may extract the configuration data from the message or secure channel at least in part based on the at least one second key, and perform an integrity check of the protected configuration data at least in part based on the at least one first key. As described in greater detail below with reference to FIG. 5, the user equipment processor may perform an integrity check such as, for example, by generating a MAC and comparing the generated MAC to the MAC previously generated by the HPLMN.

In determination block 210, the user equipment processor may determine whether the configuration data has been altered based on whether the data passes the integrity check. In some embodiments, the processor may determine that the configuration data passes the integrity check based on the comparison of the MAC generated by the user equipment processor to the MAC previously generated by the HPLMN.

In response to determining that the configuration data passes the integrity check (i.e., determination block 210="Yes"), the user equipment may apply the configuration data in block 212. For example, based on a list of preferred networks for roaming received in the configuration data, the user equipment may de-register from the VPLMN and register to another wireless communication network.

In response to determining that the configuration data does not pass the integrity check (i.e., determination block 210="No"), the user equipment may not apply the configuration data in block 214. In optional block 216, the user equipment may discard the configuration data.

In optional block 218, the user equipment may determine that the VPLMN has become non-authenticated and may de-register from the VPLMN. In various embodiments, the user equipment may take one or more further actions as part of de-registering from the VPLMN. In some embodiments, the user equipment may select another wireless communication network and may register with this other network. In some embodiments, after registering with the other network, the user equipment may add the VPLMN to a list of forbidden PLMNs for some amount of time and/or until the user equipment is shut off. In some embodiments, the user equipment may re-register with the VPLMN. For example, the user equipment may wait an amount of time and then may attempt to re-register with the VPLMN. If the user equipment is unable to re-register with the VPLMN after some number of attempts, the user equipment may select another wireless communication network and may register with this other network.

In option block 220, the user equipment may establish a connection with the HPLMN in order to retrieve the configuration data. In various embodiments, the established connection may be either a user plane or a control plan connection. In some embodiments, a domain name of a policy server within the HPLMN may be pre-configured in the user equipment and the user equipment may establish a user plane connection with the policy server to retrieve the configuration data. In other embodiments, the user equipment may determine the domain name of the policy server based on a template and an identity of the HPLMN. For example, the user equipment may determine that the domain name is "pcf.MCC.MNC.publicnetwork.3gpp.org" in which MCC+MNC is the identity of the HPLMN. In some embodiments, the user equipment may establish a control plane connection with the HPLMN and notify the HPLMN that the configuration data did not pass the integrity check, in which case the HPLMN may attempt to re-send the configuration data.

Figure 3:
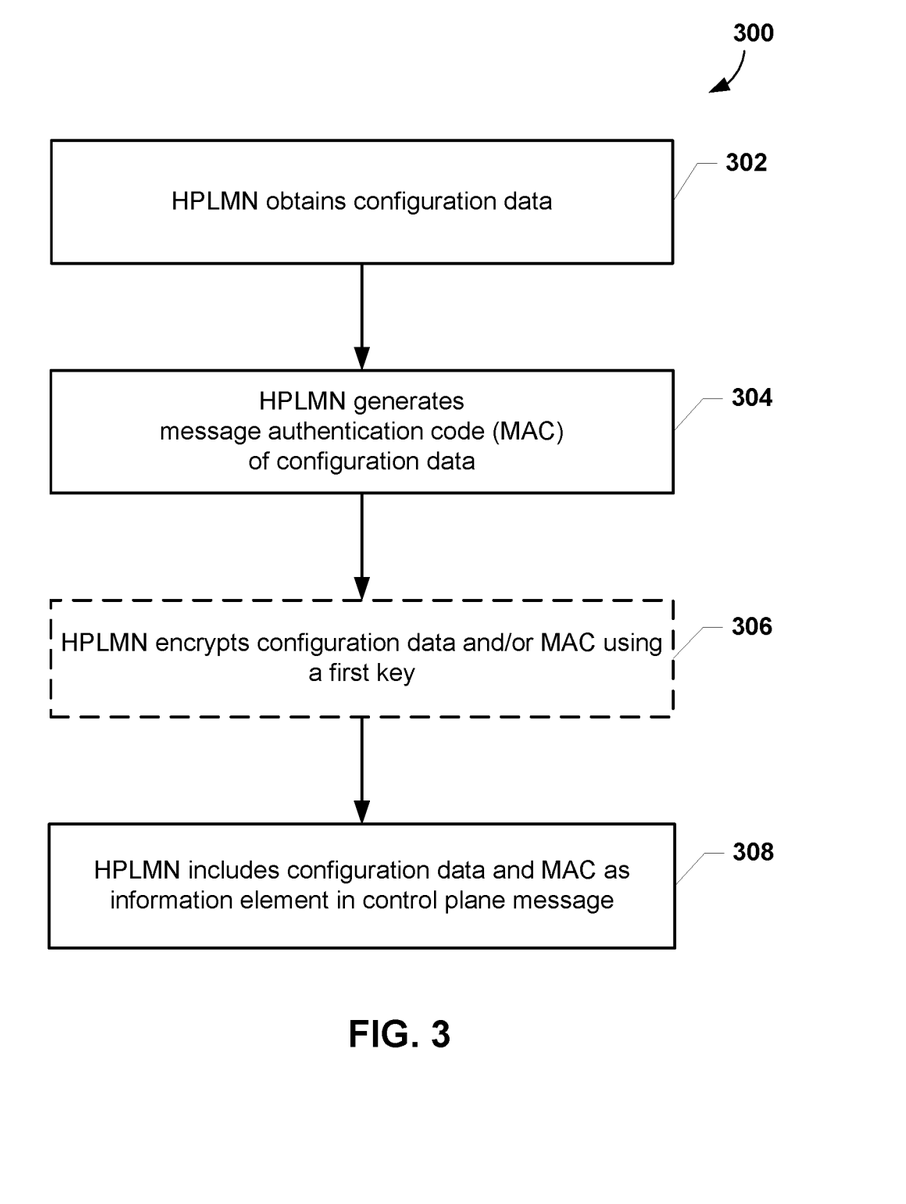
FIG. 3 is a process flow diagram illustrating a method of generating security protected configuration data by an HPLMN according to various embodiments.

FIG. 3 illustrates a method 300 for generating protected configuration data by an HPLMN according to various embodiments. With reference to FIGS. 1-3, the operations of the method 300 may be implemented by one or more processors of a computing device, such as the HSS 156, the AAA server 186, the PCF 188, and/or the UDM 190.

In block 302, the HPLMN may obtain configuration data to be sent to a user equipment, such as user equipment 102 of FIG. 1. In various embodiments, the HPLMN may obtain the configuration data from any one or more of a HSS, a AAA server, a PCF, a UDM, and/or some other element, service, or system of the HPLMN. For example, the HPLMN may retrieve a list of preferred networks for roaming associated with a user of the user equipment from a HSS, such as the HSS 156 of FIG. 1.

In block 304, the HPLMN may generate a MAC of the configuration data. In some embodiments, the HPLMN may generate the MAC by hashing or otherwise cryptographically manipulating the configuration data. In some embodiments, generating the MAC may utilize one or more keys associated with the user equipment and/or the HPLMN. For example, the HPLMN and user equipment may share a common key that is either preconfigured or generated in a predetermined fashion. In another example, a public key/private key pair may be utilized.

In optional block 306, the HPLMN may encrypt or otherwise protect the integrity of the configuration data and/or the MAC using at least one first key known to the HPLMN and user equipment subscribed to the HPLMN. In some embodiments, the HPLMN may encrypt only the configuration data. In other embodiments, the HPLMN may encrypt only the MAC. In still other embodiments, the HPLMN may encrypt each of the configuration data and the MAC separately and/or may encrypt the information element containing the configuration data and the MAC. Such optional encryption adds additional security for the configuration data and/or the MAC.

In block 308, the HPLMN may include the configuration data and the generated MAC as part of one or more information element(s) in a control plane message. In some embodiments, the control plane message may be an attach accept message, a tracking area update accept message, or a downlink Network Access Service (NAS) transport message. Equivalent control plane messages in other communication protocols (e.g., the tracking area accept message in 5G networks) may also be used in various embodiments.

Figure 4:
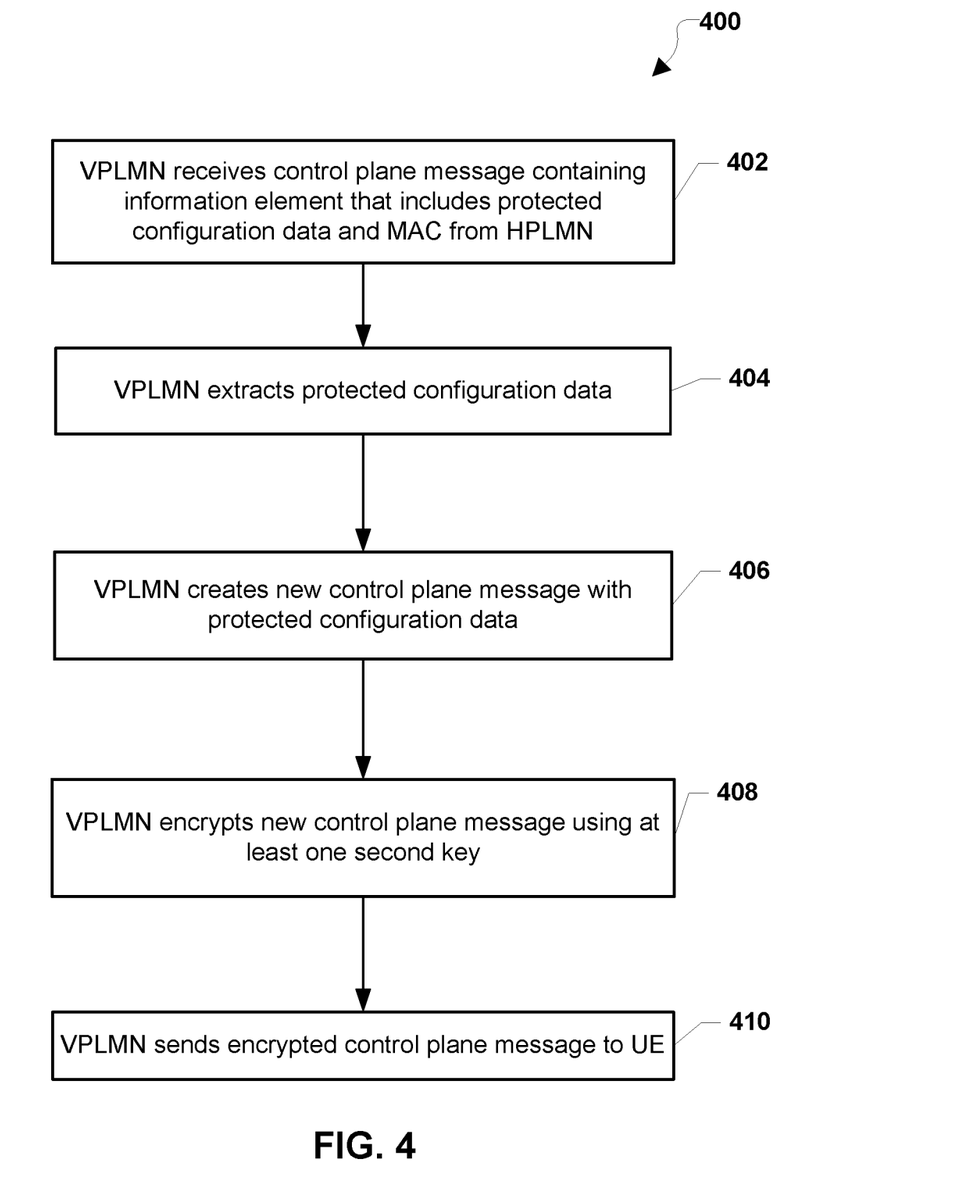
FIG. 4 is a process flow diagram illustrating a method of exchanging control plane messages by a VPLMN according to various embodiments.

FIG. 4 illustrates a method 400 for receiving configuration data in a control plane message from a HPLMN by a VPLMN and sending the configuration data in a control plane message to a user equipment according to various embodiments. With reference to FIGS. 1-4, the operations of the method 400 may be implemented by one or more processors of a computing device, such as an MME of the VPLMN (e.g., the MME 162 of FIG. 1).

In block 402, the VPLMN may receive a control plane message containing protected configuration data from the HPLMN. As discussed above, the protected configuration data may be included in an information element of the control plane message. In some embodiments, a MME (e.g., the MME 162 of FIG. 1), or equivalent element, of the VPLMN may receive the control plane message from the HPLMN. Of note, in some embodiments the control plane message may not be encrypted. Hence, the VPLMN may be able to review and/or alter the configuration data. However, as discussed further below, the included MAC may enable the user equipment to determine whether the configuration data has been altered.

In block 404, the VPLMN may extract protected configuration data from the received control plane message.

In block 406, the VPLMN may create a new control plane message including the protected configuration data. In some embodiments, the VPLMN may include the protected configuration data as part of one or more information element(s) of the new control plane message. In some embodiments, the new control plane message may be an attach accept message, a tracking area update accept message, or a downlink Non-Access Stratum (NAS) transport message. Equivalent control plane messages in other communication protocols (e.g., the tracking area accept message in 5G networks) may also be used in various embodiments.

In block 408, the VPLMN may encrypt the control plane message using at least one second key known to the VPLMN and user equipment. In some embodiments, the control plane message as a whole, including the configuration data and the MAC, may be encrypted. In various embodiments, the VPLMN and the user equipment may share a secure channel of communication and the encryption performed in block 404 may be part of sharing/establishing this secure channel.

In block 410, the VPLMN may send the encrypted control plane message to the user equipment. In various embodiments, the VPLMN utilizes the shared secure channel of communication to send the message to the user equipment.

Figure 5:
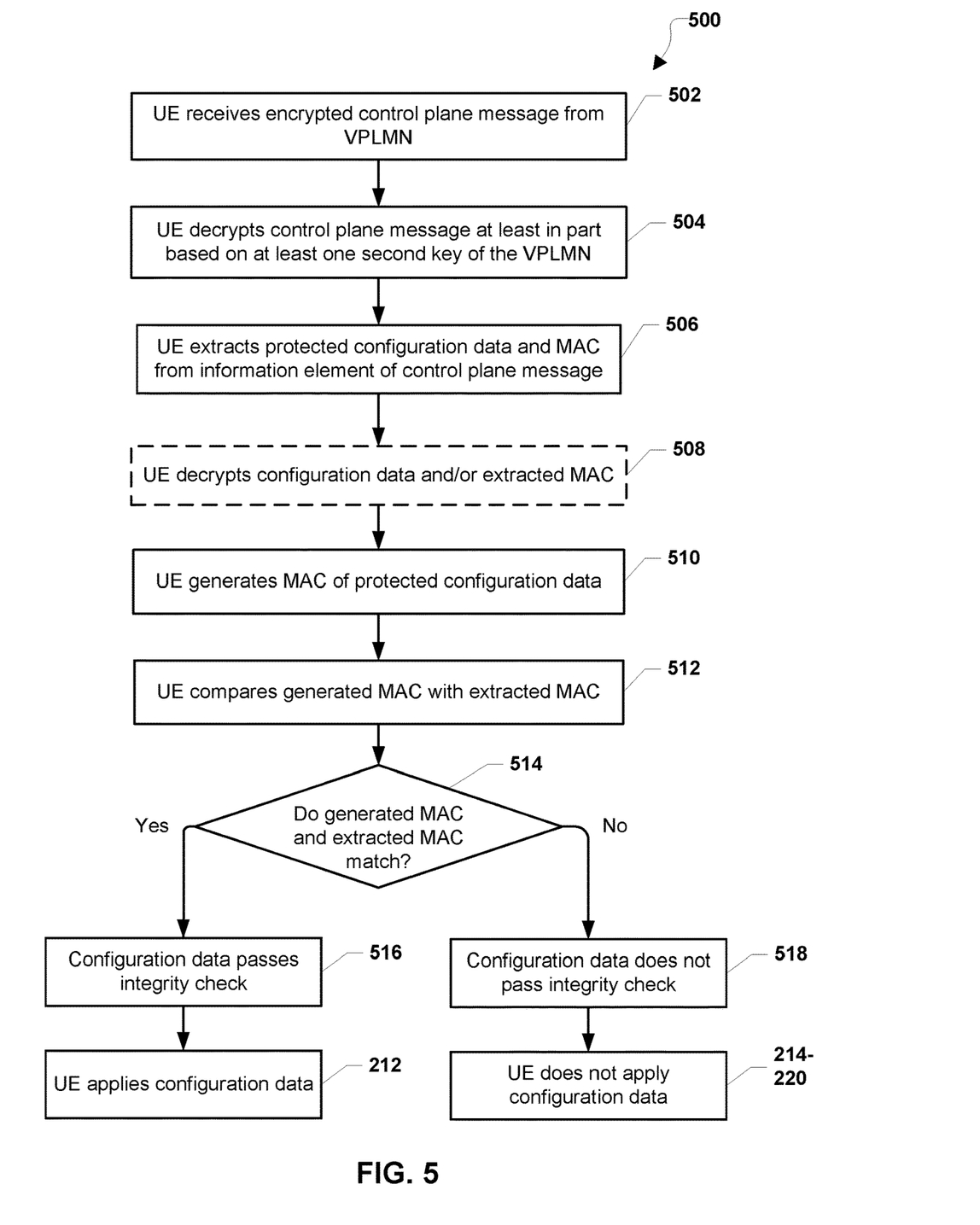
FIG. 5 is a process flow diagram illustrating a method of receiving security protected configuration data by a user equipment according to various embodiments.

FIG. 5 illustrates a method 500 for receiving secure protected configuration data from a HPLMN by a user equipment according to various embodiments. With reference to FIGS. 1-5, the operations of the method 500 may be implemented by one or more processors of the user equipment, such as the user equipment 102.

In block 502, the user equipment may receive an encrypted control plane message from the VPLMN. In various embodiments, the control plane message may be received as part of a secure channel of communication shared between the user equipment and the VPLMN. As described with reference to FIGS. 3 and 4, the message received by the user equipment may include configuration data that was received from the HPLMN (i.e., a first wireless communication network) by the VPLSMN (i.e., a second wireless communication network) in which the configuration data may be secured based on at least one first key, and the message may be secured based on at least one second key.

In block 504, the user equipment may decrypt the control plane message at least in part based on the at least one second key. In some embodiments, the user equipment may utilize a preconfigured key shared between the user equipment and the VPLMN. In other embodiments, the user equipment may generate a key based on predetermined information and may utilize the generated key to decrypt the control plane message.

In block 506, the user equipment may extract the configuration data and the MAC previously generated by the HPLMN from the control plane message. In some embodiments, the configuration data and the MAC previously generated by the HPLMN may be included as part of one or more information element(s) of the control plane message.

In optional block 508, the user equipment may decrypt the configuration data and/or the extracted MAC. As discussed above, in some embodiments the HPLMN may optionally encrypt the configuration data and/or the MAC. Hence, in these embodiments, the user equipment may decrypt the encrypted information.

In blocks 510-514, the user equipment may determine whether the configuration data has been altered at least in part based on the at least one first key similar to blocks 208 and 210 of the method 200 described with reference to FIG. 2. This determination may be made using a variety of methods that utilized the at least one first key known to the user equipment and to the HPLMN. The embodiment illustrated in blocks 510-514 is an example of such a determination.

In block 510, the user equipment may generate another MAC of the configuration data. In some embodiments, the user equipment may generate the MAC by hashing or otherwise cryptographically manipulating the configuration data. In some embodiments, generating the MAC may utilize one or more keys associated with the user equipment and/or the HPLMN. For example, the HPLMN and user equipment may share a common key that is either preconfigured or generated in a predetermined fashion. In another example, a public key/private key pair may be utilized.

In block 512, the user equipment may compare the MAC generated by the user equipment with the MAC generated by the HPLMN. Of note, two MACs will only match if the data from which the MACs are generated is not altered. Said another way, if the configuration data contained in the control plane message has been altered, the MAC generated by the user equipment will not match the MAC generated by the HPLMN.

In determination block 514, a processor of the user equipment may determine whether the generated MAC and the extracted MAC match. As mentioned above, comparing the MACs may indicate whether the configuration data has been altered.

In response to determining that the generated MAC and the extracted MAC match (i.e., determination block 514="Yes"), the user equipment processor may determine that the configuration data passes the integrity check in block 516, and apply the configuration data in response in block 212 of the method 200 described with reference to FIG. 2.

In response to determining that the generated MAC and the extracted MAC do not match (i.e., determination block 514="No"), the user equipment processor may determine that the configuration data does not pass the integrity check in block 518, and not apply the configuration data in response in blocks 214-220 of the method 200 described with reference to FIG. 2.

Figure 6:
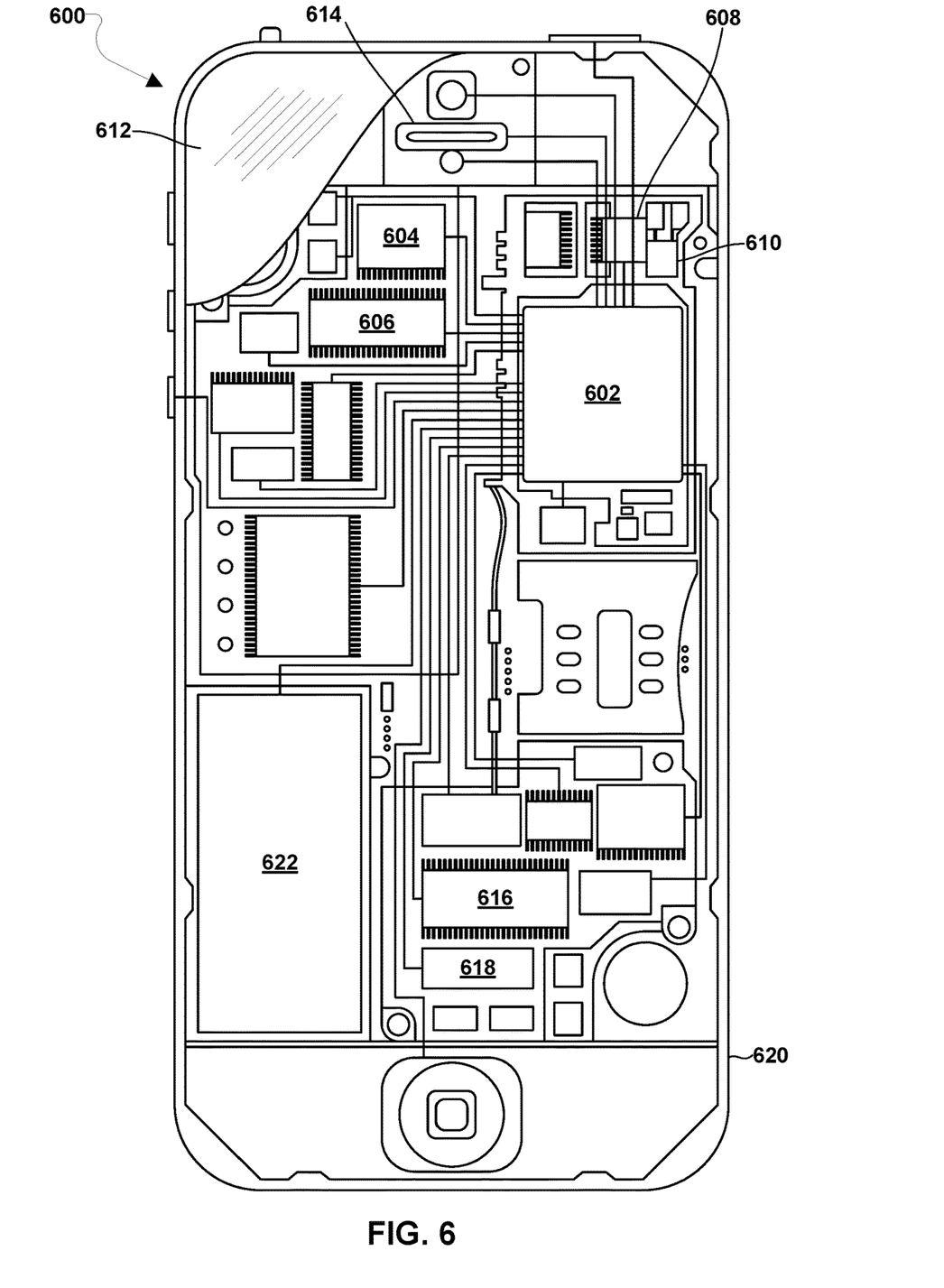
FIG. 6 is a component diagram of an example user equipment suitable for use with various embodiments.

Various embodiments (including, but not limited to, the embodiments described with reference to FIGS. 2 and 5) may be implemented in any of a variety of user equipments, an example 600 of which is illustrated in FIG. 6. With reference to FIGS. 1-6, the user equipment 600 (which may correspond, for example, to the user equipments 102 in FIG. 1) may include a processor 602 coupled to a touchscreen controller 604 and an internal memory 606. The processor 602 may be one or more multicore ICs designated for general or specific processing tasks. The internal memory 606 may be volatile or non-volatile memory, and may also be secure and/or encrypted memory, or unsecure and/or unencrypted memory, or any combination thereof.

The touchscreen controller 604 and the processor 602 may also be coupled to a touchscreen panel 612, such as a resistive-sensing touchscreen, capacitive-sensing touchscreen, infrared sensing touchscreen, etc. The user equipment 600 may have one or more radio signal transceivers 608 (e.g., Peanut®, Bluetooth®, Zigbee®, Wi-Fi, RF radio) and antennas 610, for sending and receiving, coupled to each other and/or to the processor 602. The transceivers 608 and antennas 610 may be used with the above-mentioned circuitry to implement the various wireless transmission protocol stacks and interfaces. The user equipment 600 may include a cellular network wireless modem chip 616 that enables communication via a cellular network and is coupled to the processor. The user equipment 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The user equipment 600 may also include speakers 614 for providing audio outputs. The user equipment 600 may also include a housing 620, constructed of a plastic, metal, or a combination of materials, for containing all or some of the components discussed herein. The user equipment 600 may include a power source 622 coupled to the processor 602, such as a disposable or rechargeable battery. The rechargeable battery may also be coupled to the peripheral device connection port to receive a charging current from a source external to the user equipment 600.

Figure 7:
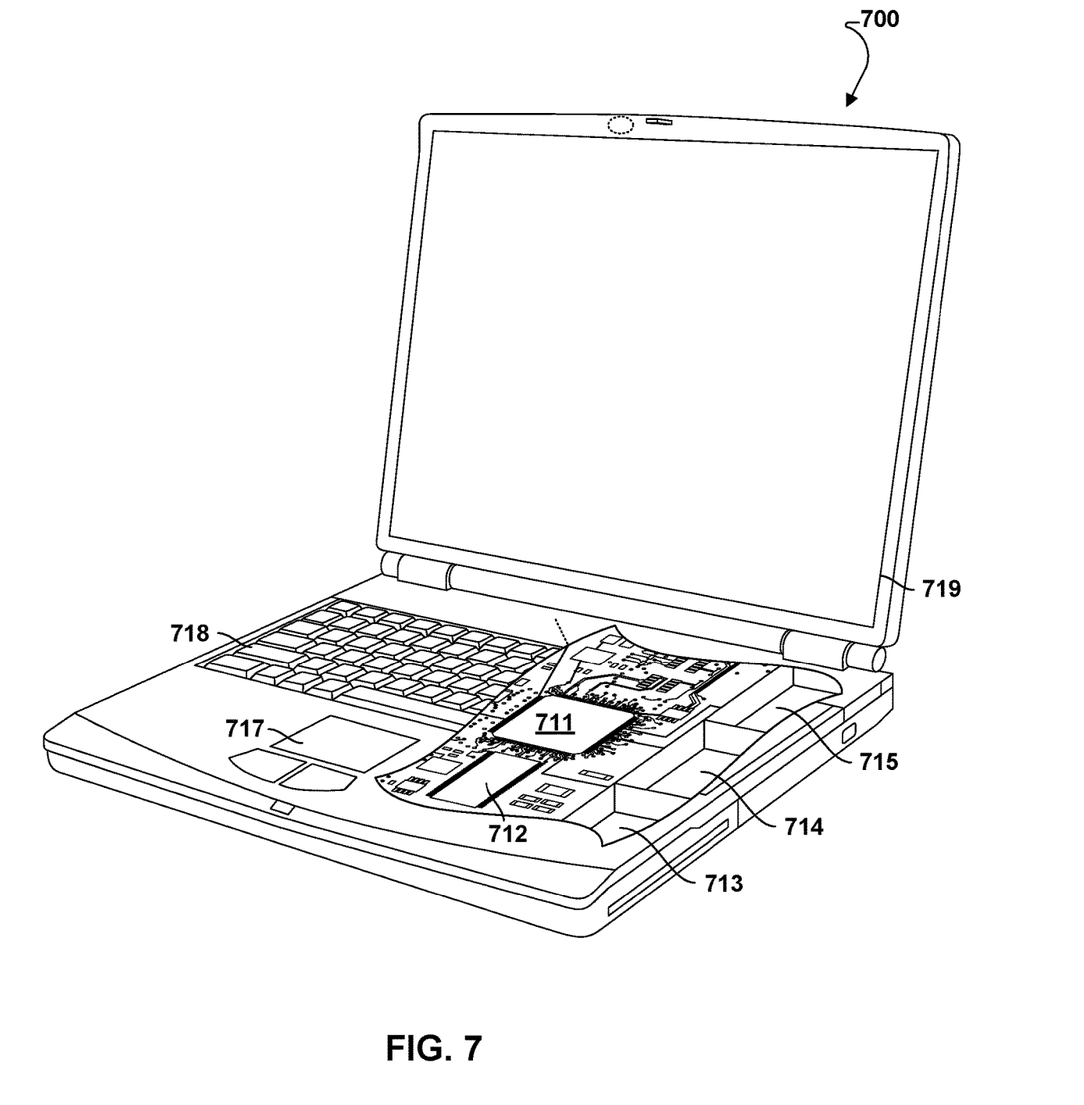
FIG. 7 is a component diagram of another example user equipment suitable for use with various embodiments.

Various embodiments (including, but not limited to, the embodiments discussed above with reference to FIGS. 2 and 5), may also be implemented within a variety of personal computing devices, an example 700 of which is illustrated in FIG. 7. With reference to FIGS. 1-7, the laptop computer 700 (which may correspond, for example, to the user equipment 102 in FIG. 1) may include a touchpad touch surface 717 that serves as the computer's pointing device, and thus may receive drag, scroll, and flick gestures similar to those implemented on wireless computing devices equipped with a touchscreen display as described. A laptop computer 700 will typically include a processor 711 coupled to volatile memory 712 and a large capacity nonvolatile memory, such as a disk drive 713 of Flash memory. The computer 700 may also include a floppy disc drive 714 and a compact disc (CD) drive 715 coupled to the processor 711. The computer 700 may also include a number of connector ports coupled to the processor 711 for establishing data connections or receiving external memory devices, such as a Universal Serial Bus (USB) or FireWire® connector sockets, or other network connection circuits for coupling the processor 711 to a network. In a notebook configuration, the computer housing includes the touchpad 717, the keyboard 718, and the display 719 all coupled to the processor 711. Other configurations of the computing device may include a computer mouse or trackball coupled to the processor (e.g., via a USB input) as are well known, which may also be used in conjunction with various embodiments.

Figure 8:
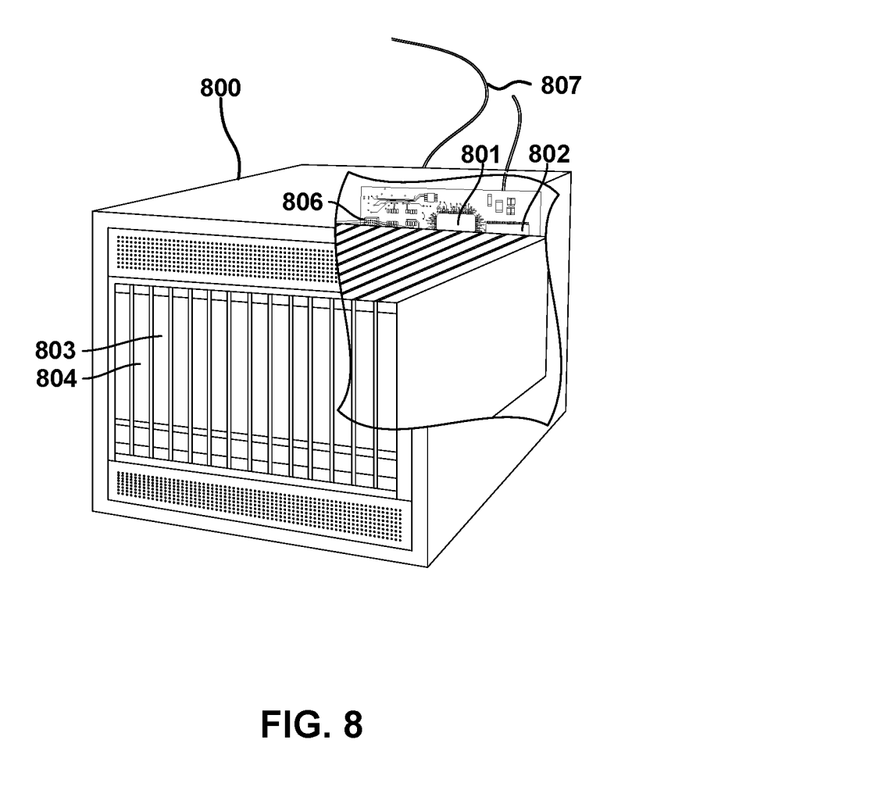
FIG. 8 is a component diagram of an example server suitable for use with the various embodiments.

The various embodiments may also be implemented on any of a variety of commercially available server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing network interface connections with a network 807, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

With reference to FIGS. 1-8, the processors 602, 711, 801 may be any programmable microprocessor, microcomputer or multiple processor chip or chips that can be configured by software instructions (applications) to perform a variety of functions, including the functions of various embodiments as described. In some devices, multiple processors may be provided, such as one processor dedicated to wireless communication functions and one processor dedicated to running other applications. Typically, software applications may be stored in the internal memory 606, 712, 713, 802, 803 before they are accessed and loaded into the processors 602, 711, 801. The processors 602, 711, 801 may include internal memory sufficient to store the application software instructions. In many devices the internal memory may be a volatile or nonvolatile memory, such as flash memory, or a mixture of both. For the purposes of this description, a general reference to memory refers to memory accessible by the processors 602, 711, 801 including internal memory or removable memory plugged into the device and memory within the processor 602, 711, 801 themselves.

The foregoing descriptions of various embodiments refer to examples of network components, messages and message content commonly implemented in LTE/4G networks. However, such examples are not intended to be limiting except when expressly recited in a claim. Various embodiments may be implemented using equivalent or similar network components, messages and message contents implemented or referenced in other communication protocols, such as 5G.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present invention is not intended to be limited to the embodiments shown herein but is to be accorded the widest scope consistent with the following claims and the principles and novel features disclosed herein.

What is claimed is:

1. A method of receiving configuration data from a first wireless communication network by a user equipment, the method comprising:
   receiving a message from a second wireless communication network, wherein:
      the message includes the configuration data received by the second wireless communication network from the first wireless communication network;
      the configuration data is secured based on at least one first key known to the first wireless communication network and the user equipment; and
      the message is secured based on at least one second key known to the second wireless communication network and the user equipment;
   extracting the configuration data from the message at least in part based on the at least one second key known to the second wireless communication network and the user equipment;
   determining whether the configuration data has been altered at least in part based on the at least one first key known to the first wireless communication network and the user equipment, wherein the at least one first key is not known to the second wireless communication network; and
   applying the configuration data in response to determining that the configuration data has not been altered.

2. The method of claim 1, wherein:
   the configuration data comprises the configuration data and a first message authentication code (MAC) of the configuration data generated by the first wireless communication network based on the at least one first key; and
   determining whether the configuration data has been altered comprises:
      generating a second MAC of the configuration data based on the at least one first key; and
      determining whether the first MAC and the second MAC match.

3. The method of claim 1, wherein:
   extracting the configuration data from the message comprises:
      decrypting the message based on the at least one second key;
      extracting encrypted configuration data from the decrypted message; and
      decrypting the encrypted configuration data based on the at least one first key.

4. The method of claim 1, further comprising discarding the configuration data in response to determining that the configuration data has been altered.

5. The method of claim 1, further comprising de-registering the user equipment from the second wireless communication network in response to determining that the configuration data has been altered.

6. The method of claim 5, further comprising placing the second wireless communication network on a list of forbidden networks.

7. The method of claim 1, further comprising establishing a connection with a server of the first wireless communication network and retrieving the configuration data from the server via the established connection in response to determining that the configuration data has been altered.

8. The method of claim 1, wherein the message is a control plane message.

9. The method of claim 8, wherein the control plane message comprises one of:
   an attach accept message;
   a tracking area update accept message; or
   a downlink NAS transport message.

10. The method of claim 1, wherein receiving a message from a second wireless communication network comprises receiving the message from a Mobility Management Entity (MME) of the second wireless communication network.

11. A user equipment for wireless communication, comprising:
   a memory; and
   a processor coupled to the memory and configured with processor-executable instructions to perform operations comprising:
      receiving a message from a second wireless communication network, wherein:
         the message includes configuration data from a first wireless communication network for the user equipment, the configuration data received by the second wireless communication network from the first wireless communication network;
         the configuration data is secured based on at least one first key known to the first wireless communication network and the user equipment; and
         the message is secured based on at least one second key known to the second wireless communication network and the user equipment;
      extracting the configuration data from the message at least in part based on the at least one second key known to the second wireless communication network and the user equipment;
      determining whether the configuration data has been altered at least in part based on the at least one first key known to the first wireless communication network and the user equipment, wherein the at least one first key is not known to the second wireless communication network; and
      applying the configuration data in response to determining that the configuration data has not been altered.

12. The user equipment of claim 11, wherein the processor is configured with processor-executable instructions to perform operations such that:
   the configuration data comprises the configuration data and a first message authentication code (MAC) of the configuration data generated by the first wireless communication network based on the at least one first key; and
   determining whether the configuration data has been altered at least in part based on the at least one first key comprises:
      generating a second MAC of the configuration data based on the at least one first key; and
      determining whether the first MAC and the second MAC match.

13. The user equipment of claim 11, wherein the processor is configured with processor-executable instructions to perform operations such that extracting the configuration data from the message comprises:
   decrypting the message based on the at least one second key;
   extracting encrypted configuration data from the decrypted message; and decrypting the encrypted configuration data based on the at least one first key.

14. The user equipment of claim 11, wherein the processor is configured with processor-executable instructions to perform operations further comprising discarding the configuration data in response to determining that the configuration data has been altered.

15. The user equipment of claim 11, wherein the processor is configured with processor-executable instructions to perform operations further comprising de-registering the user equipment from the second wireless communication network in response to determining that the configuration data has been altered.

16. The user equipment of claim 15, wherein the processor is configured with processor-executable instructions to perform operations further comprising placing the second wireless communication network on a list of forbidden networks.

17. The user equipment of claim 11, wherein the processor is configured with processor-executable instructions to perform operations further comprising establishing a connection with a server of the first wireless communication network and retrieving the configuration data from the server via the established connection in response to determining that the configuration data has been altered.

18. A user equipment for wireless communication, comprising:
means for receiving a message from a second wireless communication network, wherein:
the message includes configuration data from a first wireless communication network for the user equipment, the configuration data received by the second wireless communication network from the first wireless communication network;
the configuration data is secured based on at least one first key known to the first wireless communication network and the user equipment; and
the message is secured based on at least one second key known to the second wireless communication network and the user equipment;
means for extracting the configuration data from the message at least in part based on the at least one second key known to the second wireless communication network and the user equipment;
means for determining whether the configuration data has been altered at least in part based on the at least one first key known to the first wireless communication network and the user equipment, wherein the at least one first key is not known to the second wireless communication network; and
means for applying the configuration data in response to determining that the configuration data has not been altered.

19. The user equipment of claim 18, wherein:
the configuration data comprises the configuration data and a first message authentication code (MAC) of the configuration data generated by the first wireless communication network based on the at least one first key; and
means for determining whether the configuration data has been altered at least in part based on the at least one first key comprises:
means for generating a second MAC of the configuration data based on the at least one first key; and
means for determining whether the first MAC and the second MAC match.

20. The user equipment of claim 18, wherein means for extracting the configuration data from the message comprises:
means for decrypting the message based on the at least one second key;
means for extracting encrypted configuration data from the decrypted message; and
decrypting the encrypted configuration data based on the at least one first key.

21. A non-transitory, processor-readable storage medium having stored thereon processor-executable instructions configured to cause a processor of a user equipment to perform operations comprising:
receiving a message from a second wireless communication network, wherein:
the message includes configuration data from a first wireless communication network for the user equipment, the configuration data received by the second wireless communication network from the first wireless communication network;
the configuration data is secured based on at least one first key known to the first wireless communication network and the user equipment; and
the message is secured based on at least one second key known to the second wireless communication network and the user equipment;
extracting the configuration data from the message at least in part based on the at least one second key known to the second wireless communication network and the user equipment;
determining whether the configuration data has been altered at least in part based on the at least one first key known to the first wireless communication network and the user equipment, wherein the at least one first key is not known to the second wireless communication network; and
applying the configuration data in response to determining that the configuration data has not been altered.

22. The non-transitory, processor-readable storage medium of claim 21, wherein the configuration data comprises the configuration data and a first message authentication code (MAC) of the configuration data generated by the first wireless communication network based on the at least one first key, and
wherein the stored processor-executable instructions are configured to cause the processor of the user equipment to perform operations such that determining whether the configuration data has been altered at least in part based on the at least one first key comprises:
generating a second MAC of the configuration data based on the at least one first key; and
determining whether the first MAC and the second MAC match.

23. The non-transitory, processor-readable storage medium of claim 21, wherein the stored processor-executable instructions are configured to cause the processor of the user equipment to perform operations such that extracting the configuration data from the message comprises:
decrypting the message based on the at least one second key;
extracting encrypted configuration data from the decrypted message; and
decrypting the encrypted configuration data based on the at least one first key.

* * * * *